US010292360B2

(12) United States Patent
Fematt et al.

(10) Patent No.: US 10,292,360 B2
(45) Date of Patent: May 21, 2019

(54) MILK METER

(71) Applicant: Technologies Holdings Corp., Houston, TX (US)

(72) Inventors: Rafael A. Fematt, Sugar Land, TX (US); Yuan Ma, Pearland, TX (US)

(73) Assignee: Technologies Holdings Corp., Houston, TX (US)

( * ) Notice: Subject to any disclaimer, the term of this patent is extended or adjusted under 35 U.S.C. 154(b) by 393 days.

(21) Appl. No.: 15/138,597

(22) Filed: Apr. 26, 2016

(65) Prior Publication Data
US 2017/0303496 A1 Oct. 26, 2017

(51) Int. Cl.
| *A01J 5/01* | (2006.01) |
| *A01J 7/00* | (2006.01) |
| *G01F 1/00* | (2006.01) |
| *G01F 1/34* | (2006.01) |
| *G01F 1/56* | (2006.01) |
| *G01F 1/64* | (2006.01) |
| *A01J 5/013* | (2006.01) |
| *G01F 23/14* | (2006.01) |
| *G01F 23/18* | (2006.01) |
| *G01F 23/24* | (2006.01) |

(52) U.S. Cl.
CPC .............. *A01J 5/01* (2013.01); *A01J 5/0133* (2013.01); *A01J 7/00* (2013.01); *G01F 1/007* (2013.01); *G01F 1/34* (2013.01); *G01F 1/56* (2013.01); *G01F 1/64* (2013.01); *G01F 23/14* (2013.01); *G01F 23/18* (2013.01); *G01F 23/24* (2013.01)

(58) Field of Classification Search
CPC .. A01J 5/01; G01F 1/007; G01F 1/584; G01F 1/64
See application file for complete search history.

(56) References Cited

U.S. PATENT DOCUMENTS

| 4,346,596 A | * | 8/1982 | Diamant | A01J 5/01 |
| | | | | 73/200 |
| 4,433,577 A | * | 2/1984 | Khurgin | A01J 5/01 |
| | | | | 119/14.17 |
| 5,635,637 A | * | 6/1997 | Boult | A01J 5/01 |
| | | | | 119/14.17 |
| 5,875,675 A | | 3/1999 | Yliknuussi et al. | |
| 5,877,417 A | | 3/1999 | Arvidson et al. | |
| 2004/0045367 A1 | | 3/2004 | Bond et al. | |

OTHER PUBLICATIONS

PCT Notification of Transmittal of the International Search Report and the Written Opinion of the International Searching Authority, or the Declaration, 14 pages, dated Jul. 26, 2017.

* cited by examiner

*Primary Examiner* — Paul M. West
(74) *Attorney, Agent, or Firm* — Baker Botts L.L.P.

(57) ABSTRACT

A milk meter operably coupled to a controller, the milk meter comprising an inlet, an outlet, an inner column coupled to an opening of the outlet. The milk meter further comprises a conductivity sensor comprising a first conductive strip positioned at a first portion of the milk meter and a second conductive strip positioned substantially parallel to the first conductive strip wherein the conductivity sensor measures a change in resistance between the first and second conductive strips as fluid collects inside the milk meter before the fluid exits the milk meter through the outlet opening. The controller is operable to receive data about the fluid from the conductivity sensor and calculate a total quantity of fluid flow through the milk meter over a period of time.

13 Claims, 3 Drawing Sheets

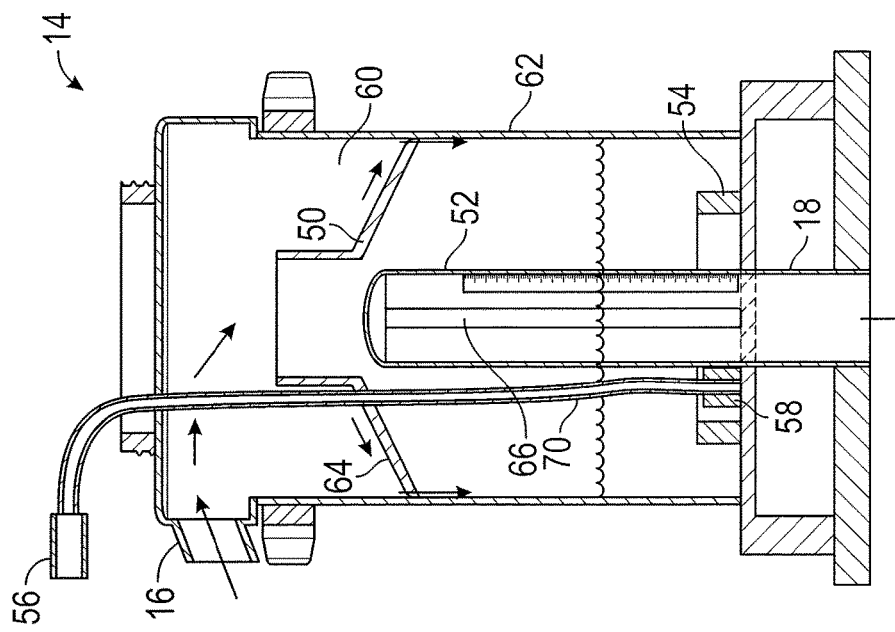
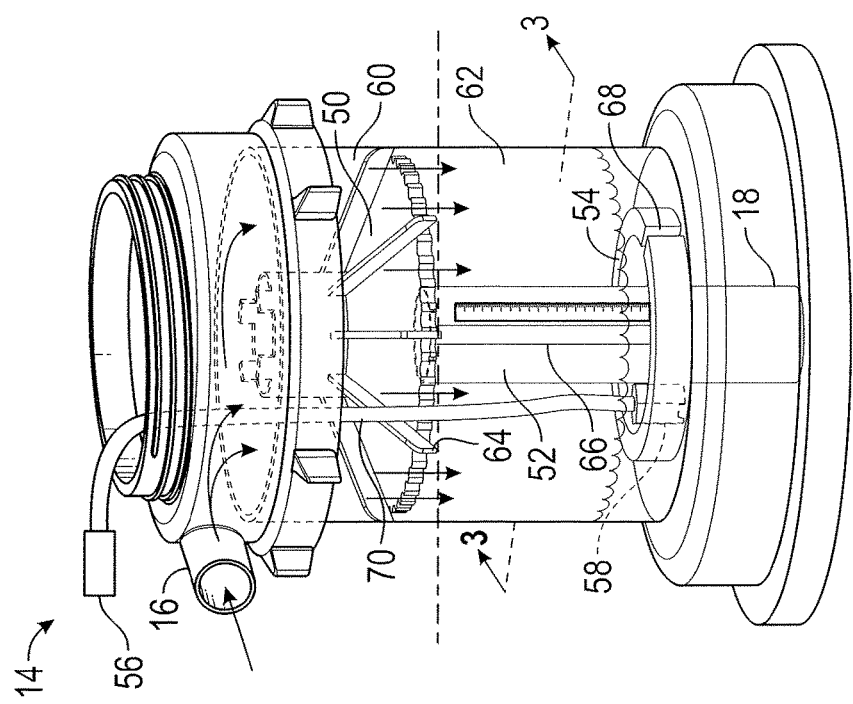

MILK METER

TECHNICAL FIELD OF THE INVENTION

This disclosure relates generally to dairy equipment and specifically to milk meters.

BACKGROUND OF THE INVENTION

Several industries require meters to measure the flow of fluid and the amount of fluid that flows through a container over a period of time. For example, in the dairy industry, it is often advantageous to be able to measure the amount of milk produced by a dairy animal during a milking session. Current mechanisms and apparatuses for measuring milk production over a period of time are inaccurate and have mechanical moving parts that cause those mechanisms and apparatuses to be ineffective and easily damaged. Thus a meter is needed for measuring the amount of fluid produced over a period of time that is accurate and has few or no moving parts.

SUMMARY OF THE INVENTION

A milk meter operably coupled to a controller, the milk meter comprising an inlet and an outlet wherein fluid flows into the milk meter through the inlet, an inner column coupled to an opening of the outlet, wherein the inner column has an opening formed therein and fluid flows out of the milk meter through the outlet opening via the inner column opening is disclosed. The milk meter further comprises a conductivity sensor comprising a first conductive strip positioned at a first portion of the milk meter along a length of the milk meter and a second conductive strip positioned substantially parallel to the first conductive strip at a second portion of the milk meter wherein the conductivity sensor measures a change in resistance between the first and second conductive strips as fluid collects inside the milk meter before the fluid exits the milk meter through the outlet opening wherein the controller is operable to receive data about the fluid from the conductivity sensor and calculate a total quantity of fluid flow through the milk meter over a period of time based on the conductivity measurements of the conductivity sensor over the period of time.

Certain embodiments of the present disclosure may provide one or more technical advantages. First, the disclosed milk meter uses no mechanical moving parts. This minimizes the potential damage that may be caused to the milk meter by the regular operation of moving mechanical equipment. For example, the present milk meter does not have moving parts that may deteriorate over time or joints that may rust or wear down due to repetitive use. Second, the present milk meter is operable with multiple different sensors types which enables compatibility with the most effective sensor for the required fluid measurement. Third, the present milk meter can control for the high velocity of milk flow as milk enter the milk meter. Fourth, the present milk meter can accurately measure the amount of milk collected for different types of milk, including milk produced by different dairy animals, notwithstanding the variety in such different types of milk.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which:

FIG. 2 illustrates an embodiment of a milk meter with a pressure sensor;

FIG. 3 illustrates a cross-section of a milk meter embodiment with a pressure sensor.

DETAILED DESCRIPTION OF THE INVENTION

Figure 1:
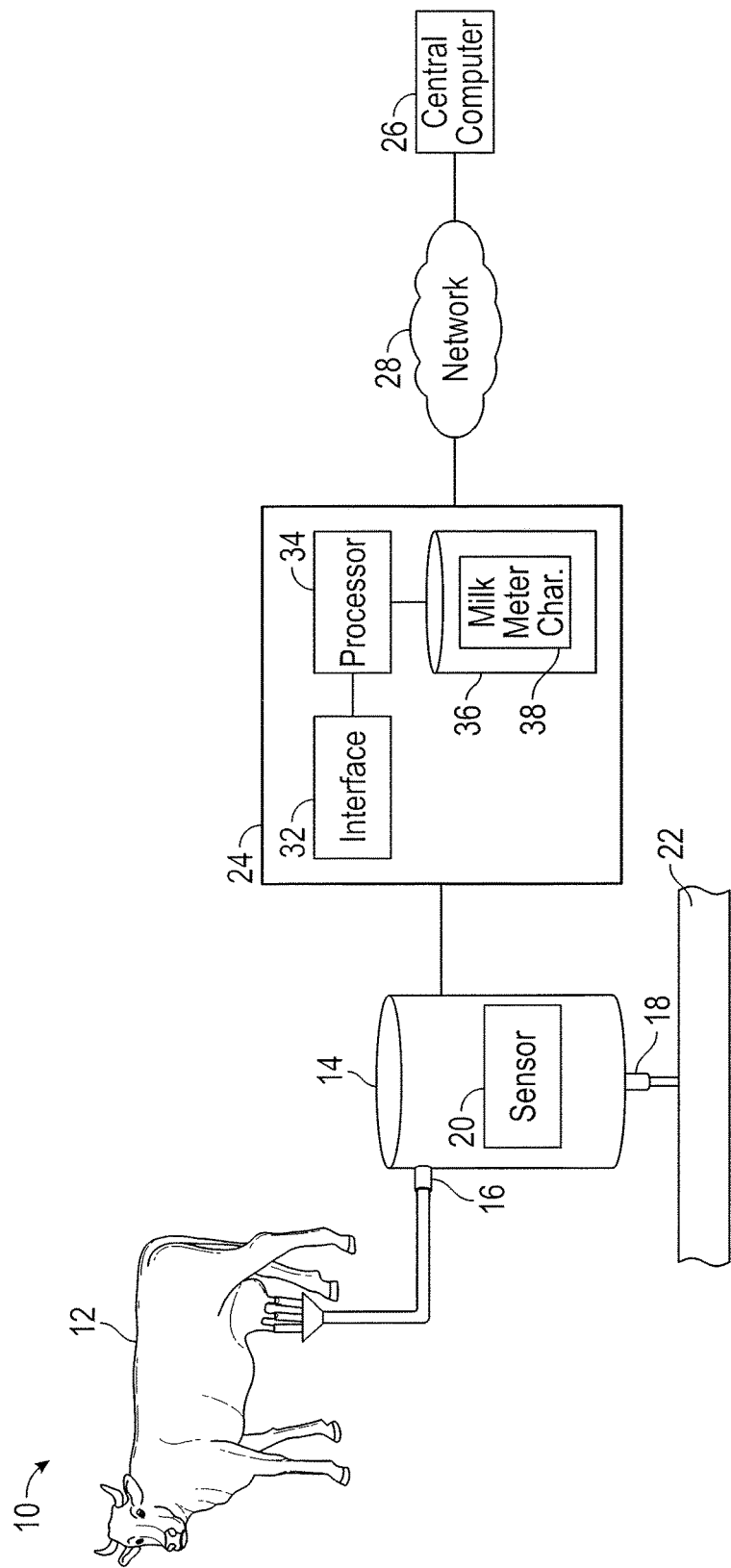
FIG. 1 illustrates one embodiment of a system for measuring the amount of milk produced by a dairy animal using a milk meter.

Embodiments of the present disclosure and its advantages are best understood by referring to FIGS. 1 through 4 of the drawings, like numerals being used for like and corresponding parts of the various drawings.

In various industries, measuring the amount of fluid that flows through an area or a container is highly desirable. For example, in the dairy industry, knowledge of how much milk is produced by a dairy animal, such as a cow, during a milking session can help determine whether the cow is healthy or needs attention. Such information can also be used to determine the overall productivity of the cow to determine whether it is consuming more than it is producing. Information on how much milk a cow is producing can also be aggregated and compared to other cows to determine which animals are performing better than others.

Dairy animals produce milk in sessions. For example, a cow may produce milk for a period of ten minutes and then it may stop producing milk. To determine the health of the cow, it is advantageous to determine how much milk is produced by the cow during a milking session. One approach for determining such milk production is collecting the milk produced during the milking session, weighing and recording it, and then dumping the milk into a larger container or pipeline. A significant disadvantage of such mechanisms is that they involve mechanical moving parts that fail over time, that cause unwanted splashing, are difficult to clean, are unsanitary, and are generally undesirable. Thus, apparatuses and methods that can measure the amount of milk produced in a session without using moving parts is advantageous.

In one embodiment contemplated by the present disclosure, a milk meter that is largely devoid of moving parts is disclosed. In a milking system, this milk meter is positioned between a dairy animal such as a cow and a milking pipeline that collects milk from multiple milking stations where dairy animals are milked. Milk flows from the dairy animal, through the milk meter, into the milking pipeline. As the milk flows through the milk meter, one or more sensors placed inside the milk meter collect data about the milk flow and send that data to a controller and/or a central computer. The controller and/or central computer then use that data to calculate the amount of milk that flowed through the milk meter for a given period of time, such as the duration of a milking session.

One embodiment of the milk meter contemplated by the present disclosure is designed to facilitate measuring the amount of milk that flows through the milk meter. Milk flows into the milk meter through an inlet that is coupled to the dairy animal. The milk then collects inside the milk meter and flows out of the milk meter through an opening inside the milk meter. The opening inside the milk meter may be of a smaller size than the inlet of the milk meter. Thus, milk may flow into the milk meter at a higher rate than it leaves the milk meter. Because the flow rate of milk entering the milk meter may be higher than the flow rate of milk escaping the milk meter, the milk may begin collecting inside the milk meter and the height of the milk inside the milk meter may begin to rise. One or more sensors may be placed inside the milk meter to collect data to determine the height of the milk inside the milk meter. Such sensors may include optical sensors, capacitive sensors, pressure sensors, conductive sensors, or any other suitable sensors for measuring milk height. For example, the sensor may transmit the opacity, pressure, conductivity, or other suitable data of the milk to a controller and/or a central computer. The controller and/or central computer may use this data to calculate the height of the milk in the milk meter over the course of the milking session. Based on this height calculation and the geometry of the milk meter, the controller and/or central computer may determine the volume of milk present in the milk meter at regular intervals over the course of a milking session. The controller and/or central computer may then use the volume calculations to determine the amount of milk produced by the dairy animal during the milking session.

Figure 4:
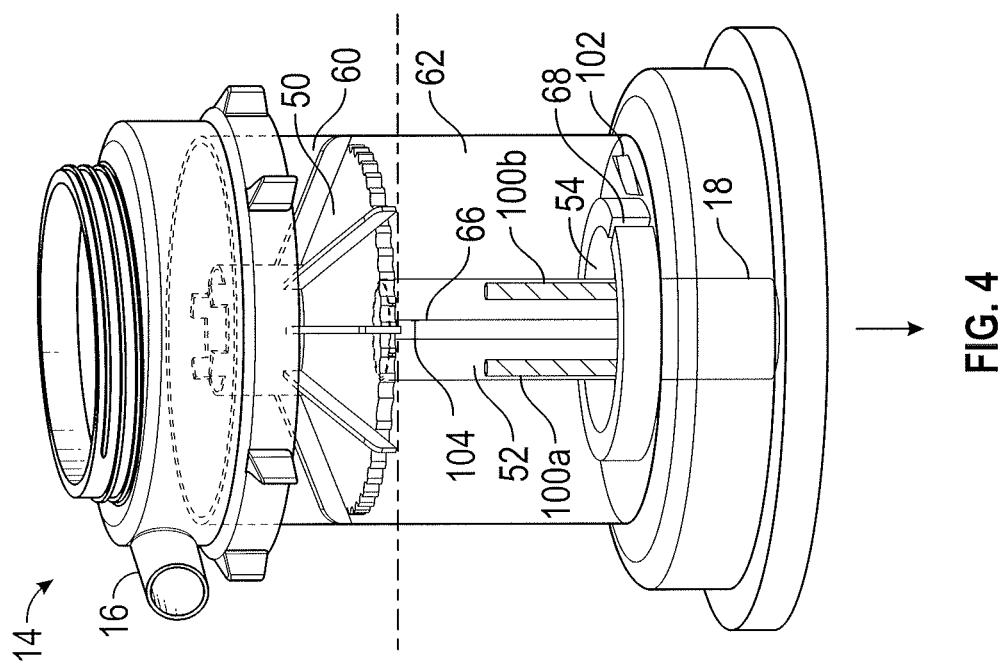
FIG. 4 illustrates an embodiment of a milk meter with conductivity sensors.

The present disclosure will be described in more detail using FIGS. 1 through 3. FIG. 1 illustrates a general overview of a system for measuring the amount of milk produced by a dairy animal using a milk meter. FIG. 2 illustrates one embodiment of a milk meter with a pressure sensor. FIG. 3 illustrates a cross-section of the milk meter with a pressure sensor. FIG. 4 illustrates another embodiment of a milk meter with a conductivity sensor. Although the figures illustrated and the description provided is in the context of a "milk" meter, it should be understood that the systems, apparatuses, and methods disclosed are not limited in any way to measuring milk flow or quantities of milk produced. The systems, apparatuses, and methods may be used in conjunction with any suitable fluids including, for example, oil, liquefied natural gas, water, or any other suitable fluid.

FIG. 1 illustrates a system 10 for measuring the amount of milk produced by a dairy animal 12. In system 10, milks flows from dairy animal 12 into milk meter 14 through a milk meter inlet 16. The milk then flows through milk meter 14 and exits milk meter 14 through milk meter outlet 18. While the milk is inside milk meter 14, a sensor 20 collects data about the milk before the milk exits through milk meter outlet 18 and into a pipeline 22. Sensor 20 sends the collected data to a controller 24. Controller 24 uses the data collected by sensor 20 to calculate the height of the milk in milk meter 14 during a milking session. Based on the calculated height, controller 24 calculates the amount of milk produced by dairy animal 12 during the milking session. Controller 24 may then send the amount of milk produced or any other relevant information to a central computer 26 via a network 28. Although controller 24 is shown as being a standalone device, in some embodiments, sensor 20 may be integrated with controller 24. In other embodiments, controller 24 may be integrated into central computer 26. Similarly, in various embodiments, sensor 20 and/or central computer 26 may perform some or all of the functionality of controller 24.

In system 10, dairy animal 12 may be any suitable dairy animal. For example, dairy animal 12 may be a cow, buffalo, goat, or any other suitable animal. As noted earlier, although the present embodiment is explained with respect to a dairy animal 12 producing milk, in other embodiments, milk meter 14 may be coupled to an oil well, a natural gas reservoir, a water reservoir or any other suitable source of fluid.

Milk meter 14 may be any device that receives milk through an inlet 16 and directs it out of milk meter 14 through outlet 18. Milk meter 14 may be made of any suitable material including any polymer or metal. Milk meter 14 may be of any suitable size and may be of different sizes depending upon the type of fluid to be used with milk meter 14. A more detailed discussion of milk meter 14, including the configuration of milk meter 14 according to one embodiment, is presented below in relation to FIG. 2. As illustrated, milk meter 14 is coupled to a pipeline 22 and milk flows from outlet 18 into pipeline 22. Pipeline 22 may be further coupled to other milking stalls and other milk meters 14.

Milk meter 14 may include a sensor 20. Sensor 20 collects information about milk as the milk flows through milk meter 14. For example, sensor 20 collects information to facilitate determining the height of milk inside milk meter 14 during a milking session. Sensor 20 can be of many different types. FIG. 2, for instance, illustrates one embodiment of milk meter 14 where sensor 20 is a pressure sensor the operation of which is discussed in greater detail with respect to FIG. 2 below. Similarly, FIG. 4 illustrates an example embodiment of milk meter 14 where sensor 20 is a conductivity sensor, the operation of which is discussed in greater detail with respect to FIG. 4 below. Along with the examples shown in FIGS. 2 and 4, sensor 20 may be of any other type that facilitates measuring the amount of fluid that flows through milk meter 14 for a certain period of time. In some embodiments, sensor 20 measures the amount of time elapsed from a first time to a second time. For example, in some embodiments, sensor 20 measures the amount of time elapsed from the beginning of a milking session to the end of the milking session. In one embodiment, sensor 20 only begins collecting data after the milk reaches a certain pre-determined height.

Controller 24 may be any module operable to receive information from sensor 20, process that information, and determine the amount of milk collected over a period of time. Controller 24 may comprise an interface 32, a processor 34, and a memory 36.

Interface 32 represents any port or connection, real or virtual, including any suitable hardware and/or software, including protocol conversion and data processing capabilities, to communicate through a LAN, WAN, or other communication system that allows controller 24 to exchange information with sensor 20, central computer 26 or any other components of system 10. Interface 32 receives information from and transmits information to the various components of system 10. Interface 32 may communicates with processor 34 and memory 36.

Processor 34 may be any electronic circuitry, including, but not limited to microprocessors, application specific integrated circuits (ASIC), application specific instruction set processor (ASIP), and/or state machines, that communicatively couples interface 32 and memory 36 and controls the operation of controller 24. In some embodiments, processor 34 may be single core or multi-core having a single chip containing two or more processing devices. Processor 34 may be 8-bit, 16-bit, 32-bit, 64-bit or of any other suitable architecture. Processor 34 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 34 may include other hardware and software that operates to control and process information. Processor 34 may execute computer-executable program instructions stored in memory 36. Processor 34 is not limited to a single processing device and may encompass multiple processing devices.

Memory 36 may include any one or a combination of volatile or non-volatile local or remote devices suitable for storing information. For example, memory 36 may include RAM, ROM, flash memory, magnetic storage devices, optical storage devices, network storage devices, cloud storage devices, solid state devices, or any other suitable information storage device or a combination of these devices. Memory 36 stores, either permanently or temporarily, data, operational software, other information for processor 34, other components of controller 24, or other components of system 10. For example, memory 36 may store user preferences or default settings for operating controller 24. Memory 36 may store information in one or more databases, file systems, tree structures, relational databases, any other suitable storage system, or any combination thereof. Furthermore, different information stored in memory 36 may use any of these storage systems. The information stored in memory 36 may be encrypted or unencrypted, compressed or uncompressed, and static or editable. Memory 36 may store information in one or more caches.

In the present embodiment, memory 36 stores milk meter characteristics 38. Milk meter characteristics 38 may include information such as the dimensions of milk meter 14. For example, milk meter characteristics 38 may include a diameter of milk meter 14. Similarly, milk meter characteristics 38 may store the relationship between milk height and the amount of milk contained in milk meter 14, the rate at which milk escapes milk meter 14 at various heights and other suitable information. Milk meter characteristics 38 may also store information relating to sensor 20. For example, in some embodiments, milk meter characteristics 38 may store the relationship between milk height and the pressure detected by sensor 20. In other embodiments, milk meter characteristics 38 may store the relationship defined by the measured resistance between two conductors and milk height in the milk meter. Additionally, milk meter characteristics 38 may store any other information relevant or useful to calculating the amount of fluid flowing through milk meter 14 over a period of time.

Network 28 may comprise any interconnecting system that facilitates wireless and/or wireline communication. Network 28 may communicate, for example, IP packets, Frame Relay frames, Asynchronous Transfer Mode (ATM) cells, voice, video, data, and other suitable information between network addresses. Network 28 may include all of a portion of a public switched telephone network (PSTN), a public or private data network, a personal area network (PANs), a local area network (LAN), a wireless LAN (WLAN), a virtual private network (VPN), a radio access network (RAN), a metropolitan area network (MAN), a wide area network (WAN), a mobile networks (e.g., using WiMax (802.16), WiFi (802.11), 3G, or any other suitable wireless technologies in any suitable combination), an enterprise intranet, a local, regional, or global communication or computer network such as the Internet, and/or any other suitable communication link, including combinations of the foregoing.

Central computer 26 may have an interface, a processor, and a memory that may all be analogous to interface 32, processor 34, and memory 36 of controller 24 respectively. In some embodiments, controller 24 may be incorporated or integrated within central computer 26 so that central computer 26 receives information from sensor 20 and performs the calculations necessary to determine the amount of milk flow through milk meter 14 over a period of time. Central computer 26 may be any module operable to receive information from sensor 20, controller 24, and/or any other component of system 10, and process, store, or display that information. Central computer 26 may be operable to display historical data collected by sensor 20 and/or calculated by controller 24. Central computer 26 may also be operable to measure the amount of time elapsed between a first time and a second time. For example, central computer 26 may measure the amount of time elapsed during a milking session and/or while sensor 20 is measuring the height of the milk in milk meter 14.

In operation, as milk flows from dairy animal 12 through milk meter 14 and into pipeline 22, sensor 20 measures characteristics of the milk flow and transmits the collected information to controller 24. Controller 24 then uses the received information to calculate the amount of milk that flowed through milk meter 14 during a suitable period of time such as during a milking session. Controller 24 transmits the calculated total milk collected to central computer 26 via network 28. Central computer 26 may aggregate the amount of milk produced by a particular dairy animal 12 or a particular milk meter 14 over the course of one or more time periods such as one or more milking sessions and make that data available to a user for any suitable purpose.

Continuing with this example embodiment, FIG. 2 illustrates a detailed view of a milk meter 14. As shown, milk meter 14 has inlet 16 and outlet 18. Further, milk meter 14 also comprises a splash guard 50, an inner column 52, a pool 54, and a pressure sensor 56 coupled to a pressure inducer 58. Milk meter 14 may be divided into two regions, the intake region 60 and the collection region 62 shown in FIG. 2 as being separated by an imaginary dashed line.

Splash guard 50 may be any device that tempers the turbulence and velocity of milk as it flows into milk meter 14. Splash guard 50 may be made of any suitable material including any suitable polymer. Splash guard 50 may be of a substantially conical shape and may be positioned inside intake region 60 of milk meter 14 so that as milk enters milk meter 14, the milk is directed toward the perimeter of milk meter 14. Splash guard 50 may be positioned so that a plurality of apertures 64 are formed between splash guard 50 and the inside surface of milk meter 14 as shown in FIG. 2. In this manner, as milk enters milk meter 14 through inlet 16, the milk lands on splash guard 50 and loses some of its kinetic energy causing the milk to slow down and flow down the sides of splash guard 50 and into collection region 62 of milk meter 14 via apertures 64. In this manner, the splashing of the milk inside collection region 62 of milk meter 14 is reduced.

As illustrated in FIG. 2, inner column 52 may extend vertically from a first opening of outlet 18 through collection region 62 of milk meter 14. Inner column 52 may be made of any suitable material including material that is the same or different from the material comprising the other components of milk meter 14. Inner column 52 may be any structure that restricts the flow of milk or other liquids into the first opening of outlet 18. In the illustrated embodiment, inner column 52 is positioned on top of and around the first opening of outlet 18 so that milk or other liquids are unable to enter outlet 18 without passing through inner column 52 first. In other embodiments inner column 52 may be coupled to the first opening of outlet 18 in any suitable manner. Inner column 52 may be hollow and may have one or more openings 66 formed along the length of inner column 52. For example, in the embodiment illustrated in FIG. 2, opening 66 is a vertical slot that is formed along one portion of inner column 52 and extends along the entire length of inner column 52. In other embodiments, opening 66 may extend through a portion of or the entire length of inner column 52. In some embodiments, openings 66 is tapered so that it is smaller near the base of milk meter 14 where inner column 52 is closest to outlet 18 and larger near the other end of inner column 52 farthest from outlet 18. In this manner, as the height of the milk in collection region 62 increases, the flow rate of milk flowing out of collection region 62 also increases. This prevents the milk from filling up collection region 62 and flooding milk meter 14. As another safety precaution, inner column 52 may be open on top so that if the milk height inside milk meter 14 ever exceeds the height of inner column 52, the excess milk flows into inner column 52 and out of milk meter 14 through outlet 18.

In some embodiments, milk meter 14 may have a pool 54. Pool 54 may be formed upon the base of collection region 62 inside milk meter 14 by fencing off a portion of the base of collection region 62 with a barrier. Pool 54 may have a pool opening 68 that allows milk to flow into pool 54. Pool 54 may surround or partially surround inner column 52 and has a larger diameter than inner column 52. However, pool 54 has a smaller diameter than the diameter of collection region 62 of milk meter 14.

As noted in the discussion of FIG. 1 above, sensor 20 may be of many different types. In the embodiment illustrated in FIG. 2, sensor 20 is a pressure sensor 56. Pressure sensor 56 may be any device operable to measure the pressure exerted by a fluid on the sensor. In this embodiment, pressure sensor 56 is coupled to a pressure inducer 58 by a pressure tube 70. Pressure inducer 58 may be placed inside pool 58 so that pressure inducer 58 is submerged as soon as pool 58 is filled. This allows pressure sensor 56 to begin measuring the pressure induced by the milk in milk meter 14 as milk flows into milk meter 14. As explained in greater detail below, the pressure readings can be used to calculate milk flow and the quantity of milk produced over a period of time.

At one end of pressure tube 70, pressure sensor 56 seals pressure tube 70 so that little to no air or other fluid may enter pressure tube 70. At the other end, pressure tube 70 is coupled to pressure inducer 58. Pressure inducer 58 may be any device that is coupled to the base of milk meter 14 and couples pressure tube 70 to the base of milk meter 14. Pressure inducer 58 may have one or more openings formed therein. As pressure inducer 58 is submerged in milk, the milk enters pressure inducer 58 through the one or more openings of pressure inducer 58 and pushes air into pressure tube 70. The air inside pressure tube 70 becomes trapped because pressure tube 70 is sealed by pressure sensor 56 at one end and sealed by the milk at the other end. As more milk flows into milk meter 14, the pressure the milk induces onto the air trapped inside pressure tube 70 increases. Pressure sensor 56 measures this pressure and transmits the measured pressure to controller 24. By using the measured milk pressure information along with meter characteristics 38 in memory 36, controller 24 calculates the height of the milk in collection region 62 over a period of time. Controller 24 then uses this calculated height to calculate the total volume of milk contained in collection region 62 at multiple time intervals over the period of time. Controller 24 uses this information, along with information about the amount of milk that flows out of milk meter 14 through opening 66 in inner column 52 over the course of the measured time period to calculate the total amount of milk produced and the milk flow rate over a time period.

The following explanation presents one simplified example of how the components of system 10 may function together to determine a flow rate and a quantity of milk produced over a period of time. This hypothetical example is merely illustrative and is in no way limiting. In this hypothetical example, controller 24 determines, based on information such as a relationship between pressure and milk height stored in memory 36, that a reading of 1 in Hg above atmospheric pressure by pressure sensor 56 corresponds to a milk height of 1 inch inside milk meter 14. Based on the geometry of milk meter 14, controller 24 determines that a milk height of 1 inch corresponds to 10 mL of milk inside milk meter 14. Further, controller 24 determines that at a height of 1 inch, milk flows out of milk meter 14 through opening 66 in inner column 52 at a rate of 1 mL per second. Controller 24 may determine this flow rate based on the known geometry of milk meter 14 and the known size of opening 66 in inner column 52. Controller 24 may then sample the pressure reading of pressure sensor 56 at a periodic rate to determine the amount of milk present inside milk meter 14 at a one or more times. For example, controller 24 may sample the pressure readings at a rate of one reading per second. So, for instance, if pressure sensor 56 measures a pressure of 1 in Hg at time=1 second and again measures a pressure of 1 in Hg at time=2 seconds, controller 24 may determine that because the flow rate of milk flow out of milk meter 14 at a milk height of 1 inch is 1 mL per second, the amount of milk collected during the 1 elapsed second is approximately 1 mL. Controller 24 may use this flow rate data for any suitable purpose including aggregating this data over a suitable time period to calculate the total amount of milk collected over that period of time. Thus, for example, if controller 24 determined that the milk height inside milk meter 14 is 1 inch for a period of 10 seconds, controller 24 could calculate that approximately 10 mL of milk had been collected over the 10 second time period.

FIG. 3 illustrates a cross-sectional view of the milk meter 14 illustrated in FIG. 2. As shown, milk or other suitable fluids flow into milk meter 14 through inlet 16. The milk then flows onto splash guard 50 which tempers the turbulence and velocity of the milk. The milk flows down splash guard 50 and into collection region 62 via apertures 64 in splash guard 50. As the milk collects in collection region 62, it begins exerting pressure upon pressure sensor 56 via pressure tube 70. The end of pressure tube 70 that is coupled to pressure inducer 58 is open but the end of pressure tube 70 coupled to pressure sensor 56 is sealed. Thus, as the milk attempts to enter pressure tube 70 via pressure inducer 58, the air trapped inside pressure tube 70 prevents the milk from entering pressure tube 70. Instead, the trapped air exerts an air pressure upon pressure sensor 56. This air pressure increases as the amount of milk collected inside collection region 62 increases. Using this measured air pressure, controller 24 is operable to calculate the height of the milk collected inside collection region 62 as explained above in reference to FIG. 2.

The milk that collects inside collection region 62 flows out of collection region 62 via opening 66 in inner column 52. After the milk flows out of collection region 62, the milk continues its flow out of milk meter 14 through outlet 18.

FIG. 4 illustrates another embodiment of milk meter 14 where sensor 20 is a conductivity sensor instead of a pressure sensor. In the illustrated milk meter 14, conductivity strips 100a and 100b and conductivity sensor 102 are shown.

Conductive strips 100a and 100b are coupled to inner column 52 and are positioned substantially parallel to each other. In this embodiment, inner column 52 may be made of a highly resistive material such as a highly resistive polymer. Conductive strips 100a and 100b are positioned so that as the height of the collected milk increases, relatively equal portions of conductive strips 100a and 100b are submerged by the milk. Conductive strips 100a and 100b are operable to measure the drop in resistance between each other. Thus, when the two strips are inside milk meter 14 while milk meter 14 does not contain any milk or other fluid, conductive strips 100a and 100b register a very high resistance value between them. As the amount of milk in milk meter 14 increases, greater portions of conductive strips 100a and 100b become submerged and the resistance between the two conductive strips 100a and 100b drops. Conductive strips 100a and 100b measure this drop in resistance and send this information to controller 24 which then determines the height of the milk inside milk meter 14 based on the change in resistance values. Using this calculated height of the milk inside milk meter 14, controller 24 is able to calculate the total amount of milk produced during a milking session as explained above with respect to FIG. 2.

The embodiment of FIG. 4 also includes conductivity sensor 102 that is coupled at or near the base of milk meter 14. Milk produced at various times and by different dairy animals 12 contain different amounts of certain elements and compounds, such as salt, that affect the conductivity of the milk. For example, milk produced by a dairy animal towards the beginning of a milking cycle may have a higher conductivity than milk produced towards the end of the milking cycle. Similarly, milk produced by a first cow may be more conductive than milk produced by a second cow. Because controller 24 calculates the height of the milk based on the change in conductivity between conductive strips 100a and 100b, controller 24 may need to control for variations in conductivity in different milk types. Conductivity sensor 102 measures the conductivity of the milk and provides that information to controller 24. Controller 24 uses this information to compensate for the variation in conductivities that occur between different milk types. In one embodiment, controller 24 normalizes the resistance drop between conductive strips 100a and 100b by multiplying the measured resistance drop by the conductivity measured by conductivity sensor 102.

The following explanation presents one example of how the components of system 10 may function together to determine a flow rate and a quantity of milk produced over a period of time. This hypothetical example is merely illustrative and is in no way limiting. In this hypothetical example, controller 24 may calculate, based on information such as a relationship between conductivity and milk height inside milk meter 14 stored in memory 36, that a reading of, for example, 10 Ohms between the first conductive strip 100a and the second conductive strip 100b corresponds to a milk height of 1 inch inside milk meter 14. Certain fluids may have a higher conductivity than others. For example, cow milk may have a higher conductivity than sheep milk. To compensate for the varying conductivities, controller 24 may multiply the measured 10 Ohm resistance by the conductivity measured by conductivity sensor 102. For a fluid with a measured conductivity of, for example, 0.1 Ohm$^{-1}$, controller 24 may calculate a normalized resistance value of 1. Controller 24 may then use this normalized value instead of the measured actual resistance value between conductive strip 100a and 100b to calculate the height of the fluid inside milk meter 14. Using the calculated height as well as the geometry of milk meter 14, controller 24 may calculate the flow rate, total fluid produced or any other suitable information for a period of time in the manner described above with respect to FIG. 2.

In different embodiments, the amount of fluid flow through opening 66 may be governed by various different fluid flow equations. In one embodiment, the fluid flow through opening 66 is governed by the equation:

$$Q = \int_{H_1}^{H_2} C_d \cdot b \cdot dh \cdot \sqrt{2gh} = C_d \cdot b \cdot \int_{H_1}^{H_2} \sqrt{2gh} \, dh = \tfrac{2}{3} \cdot C_d \cdot b \cdot \sqrt{2g} (H_2^{3/2} - H_1^{3/2})$$

where
Q=amount of fluid flow through opening 66;
$H_1$=height of fluid above top of opening 66;
$H_2$=height of fluid above base of opening 66 and below top of opening 66;
b=width 104 of opening 66; and
$C_d$=coefficient of discharge i.e. the actual discharge to the theoretical discharge through opening 66.

In other embodiments, the amount of fluid flow through opening 66 may be governed by different mathematical functions depending upon the geometry of opening 66 and overall shape and structure of milk meter 14.

Modifications, additions, or omissions may be made to the systems, apparatuses, and processes described herein without departing from the scope of the disclosure. The components of the systems and apparatuses may be integrated or separated. Moreover, the operations of the systems and apparatuses may be performed by more, fewer, or other components. The methods may include more, fewer, or other steps. Additionally, steps may be performed in any suitable order. Additionally, operations of the systems and apparatuses may be performed using any suitable logic. As used in this document, "each" refers to each member of a set or each member of a subset of a set.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants do not intend any of the appended claims to invoke 35 U.S.C. § 112(f) as it exists on the date of filing hereof unless the words "means for" or "step for" are explicitly used in the particular claim.

What is claimed is:

1. A milk meter operably coupled to a controller, the milk meter comprising:
    an inlet and an outlet wherein fluid flows into the milk meter through the inlet;
    an inner column coupled to and positioned on top of an opening of the outlet, wherein the inner column has an opening formed along one portion of the inner column and fluid flows out of the milk meter through the outlet opening via the inner column opening; and
    a first conductivity sensor comprising a first conductive strip positioned at a first portion of the milk meter along a length of the milk meter and a second conductive strip positioned substantially parallel to the first conductive strip at a second portion of the milk meter wherein the first conductivity sensor measures a change in resistance between the first and second conductive strips as fluid collects inside the milk meter and exits the milk meter through the outlet opening; and wherein the controller is operable to receive data about the fluid from the first conductivity sensor and calculate a total quantity of fluid flow through the milk meter over a period of time based on the conductivity measurements of the first conductivity sensor over the period of time.

2. The milk meter of claim 1, further comprising a second conductivity sensor positioned at a base of the milk meter, wherein the second conductivity sensor is operable to measure a conductivity of the fluid in the milk meter.

3. The milk meter of claim 2, wherein the controller is further operable to compensate for different conductivities of different fluids based on the conductivity measurement of the second conductivity sensor.

4. The milk meter of claim 1, wherein the controller is operable to calculate the total quantity of fluid flow through the milk meter by first calculating the height of the fluid inside the milk meter based on the measured changes in resistance between the first conductive strip and the second conductive strip.

5. The milk meter of claim 4, wherein the controller is operable to calculate the total quantity of fluid flow by measuring variations in fluid height over the period of time and determining, based on the fluid height variations, the amount of fluid flow out of the milk meter over the period of time.

6. The milk meter of claim 1, wherein the opening formed in the inner column extends along the length of the inner column.

7. The milk meter of claim 1, wherein the opening formed in the inner column is tapered so that it is smaller at a first end and larger at a second end.

8. The milk meter of claim 1, further comprising a barrier positioned at a base of a milk collection region, the barrier partially encircling the inner column.

9. A method comprising:

receiving fluid in a milk meter, wherein the fluid flows through an inlet and through a plurality of apertures formed between a splash guard and an inner surface of the milk meter, the splash guard being positioned inside the milk meter and in the path of fluid flow from the inlet to the milk meter;

collecting data, by using a sensor, about the fluid as the fluid flows into the milk meter through the plurality of apertures, collects inside the milk meter, and flows out of the milk meter through a milk meter outlet via an opening in an inner column, wherein the inner column is coupled to and positioned on top of the milk meter outlet, and wherein the opening in the inner column is formed along one portion of the inner column;

transmitting the collected data to a controller for calculating the height of the fluid inside the milk meter over a period of time; and calculating the total volume of the fluid flowing through the milk meter over the period of time based in part on the calculated height of the fluid over the period of time.

10. The method of claim 9, wherein the sensor comprises:

a first conductivity sensor positioned at a base of the milk meter, wherein the first conductivity sensor is operable to measure a conductivity of the fluid in the milk meter; and a second conductivity comprising a first conductive strip positioned at a first portion of the milk meter along a length of the milk meter and a second conductive strip positioned substantially parallel to the first conductive strip at a second portion of the milk meter;

wherein collecting data, using the sensor, further comprises the second conductivity sensor measuring a change in resistance between the first conductive strip and the second conductive strip as the amount of fluid in the milk meter changes.

11. The method of claim 10, wherein calculating the height of the fluid inside the milk meter over a period of time further comprises measuring changes in resistance between the first conductive strip and the second conductive strip as the height of the fluid inside the milk meter changes.

12. The method of claim 11, wherein calculating the height of the fluid inside the milk meter over a period of time further comprises compensating for different conductivities of different fluids based on a conductivity measurement of the first conductivity sensor.

13. The method of claim 9, wherein the opening formed in the inner column extends along the length of the inner column.

* * * * *